United States Patent [19]

Salin

[11] 4,079,925

[45] Mar. 21, 1978

[54] HEAD END CLOSURE FOR THE CYLINDER OF A PISTON AND CYLINDER ASSEMBLY

[75] Inventor: Gustav G. Salin, Rockford, Ill.

[73] Assignee: Atwood Vacuum Machine Company, Rockford, Ill.

[21] Appl. No.: 710,898

[22] Filed: Aug. 2, 1976

[51] Int. Cl.² ............................................. F16F 9/36
[52] U.S. Cl. .................................. 267/129; 188/322; 267/64 R; 267/65 R
[58] Field of Search ............... 267/65 R, 65 A, 64 R, 267/64 A, 126, 129; 188/321, 322; 220/307, 67; 29/DIG. 35

[56] References Cited

U.S. PATENT DOCUMENTS 2,461,132   2/1949   Urschel et al. .................... 220/67

FOREIGN PATENT DOCUMENTS 1,966,869   12/1974   Germany ........................ 188/327

*Primary Examiner*—James B. Marbert
*Attorney, Agent, or Firm*—Leydig, Voit, Osann, Mayer & Holt, Ltd.

[57] ABSTRACT

A gas spring for movable members such as vehicle deck lids in which a piston assembly carried on the end of a rod slides back and forth in a cylinder to expand and contract the spring. The cylinder is sealed at the head end and also around the rod and is filled with a combination of oil and gas under pressure. The piston assembly is such that the passage of oil and gas from one side to the other is restricted as the spring is expanded by extending the rod and this produces a dampening action but the restriction is eliminated when the spring is contracted so that there is virtually no dampening effect. The head end of the cylinder is closed by a plug which includes an inner portion carrying an O-ring to form a seal between the plug and the cylinder and an outer portion with peripheral teeth which bite into the cylinder wall and hold the plug in place.

2 Claims, 6 Drawing Figures

HEAD END CLOSURE FOR THE CYLINDER OF A PISTON AND CYLINDER ASSEMBLY

BACKGROUND OF THE INVENTION

The present invention relates to a piston and cylinder arrangement wherein a piston slides back and forth within a cylinder. More particularly, the invention relates to such an assembly in which a rod is conneced to the piston and projects out of the cylinder through one end of the cylinder, usually called the rod end, and the other end or head end of the cylinder is closed.

SUMMARY OF THE INVENTION

The principal object of the invention is to provide a new and improved closure for the head end of the cylinder which closure essentially is a novel plug which simply is inserted in the head end and provides afluid tight closure without the necessity of other operations such as welding.

A more detailed object is to form the plug with integral inner and outer cylindrical portions with the inner portion fitting snugly within the cylinder and carrying a sealing element and with the outer portion formed with generally longitudinally extending teeth which bite into the wall of the cylinder and hold the plug in place.

The invention also resides in the particular construction of the plug and its coaction with the cylinder.

DETAILED DESCRIPTION OF THE PREFERRED EMBODIMENT

Figures 1, 2, 3:
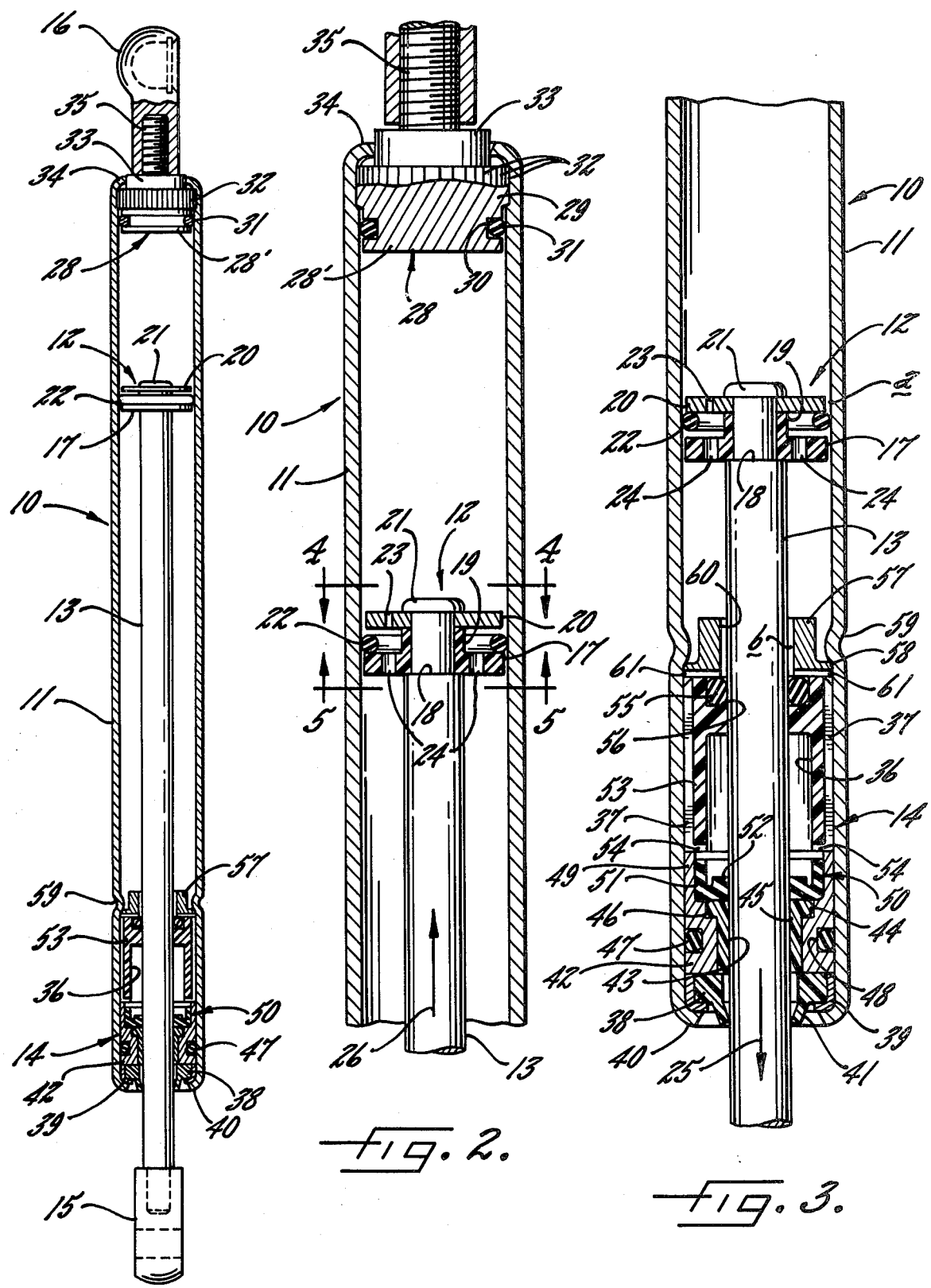
FIG. 1 is a longitudinal sectional view of a piston and cylinder assembly as used in a gas spring and incorporating the present invention.
FIG. 2 is an enlarged fragmentary sectional view similar to FIG. 1 and showing the head end portion of the spring.
FIG. 3 is an enlarged fragmentary sectional view similar to FIG. 1 and showing the rod end of th spring with the parts in a moved position.

Although the invention is applicable to cylinders adapted for various uses, it is shown in the drawings for purposes of illustration as embodied in a gas spring 10 for lifting and holding a movable member, such as a hinged vehicle deck lid (not shown), in a predetermind position. Herein, the spring includes an elongated cylinder 11 closed at its upper end and a piston assembly 12 carried on the end of a rod 13 which slidably projects into the cylinder through a seal assembly 14 disposed within the cylinder adjacent the lower end thereof. Although the spring may be inverted, it is shown herein when using the spring with a vehicle deck lid with the projecting end of the rod 13 pivotally connected to the lid by a fitting 15 on the rod and the cylinder 11 pivotally connected to the vehicle body by a fitting 16 secured to the top or closed end of the cylinder.

Figure 4:
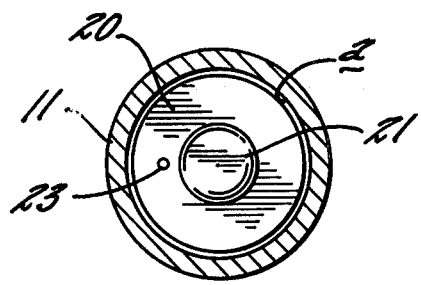
FIG. 4 is a sectional view taken along the line 4—4 in FIG. 2.
Figure 5:
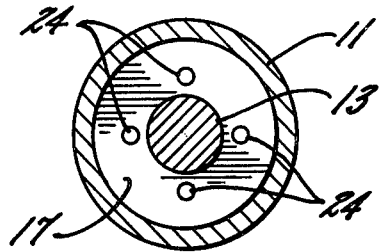
FIG. 5 is a sectional view taken along the line 5—5 in FIG.2.

In the present instance, the piston assembly 12 includes a lower washer 17 which is made of any suitable plastic-like material such as nylon and is seated on a shoulder 18 (FIGS. 2 and 3) on the rod 13 adjacent the upper end thereof. An upwardly projecting hub 19 on the washer supports a second washer 20 which herein is made of metal, the hub serving as a spacer to separate the two washers. A head 21 is upset on the upper end of the rod to hold the washers firmly in place on the rod and a rubber O-ring 22 is disposed between the washers. Preferably, the diameter of the plastic washer 17 is slightly smaller than the internal diameter of the cylinder 11 and the metal washer 20 is somewhat smaller in diameter than the plastic washer. A small orifice 23 is formed in the metal washer (see FIG. 4) and a plurality of holes 24, herein four, are formed in the plastic washer (FIG. 5) and are equally spaced around the center of the latter. For a purpose to be described later, the total area of these holes 24 is approximately equal to the area $a$ (FIG. 4) between the metal washer 20 and the cylinder 11. The cylinder is filled with a pressure fluid which herein is a combination of oil and an inert gas, such as nitrogen, under pressure. The particular proportions vary with the intended use of the spring but a ratio of one-third oil and two-thirds gas is exemplary.

With the foregoing arrangement, the hinged member or deck lid is raised by sliding the rod 13 down relative to the cylinder 11, as indicated by the arrow 25 in FIG. 3. Under these conditions, the O-ring 22 slides up relative to the rod and into engagement with the metal washer 20 thereby sealing the area $a$ between the metal washer and the cylinder. As a result, as the spring is expanded, oil and gas beneath the piston assembly 12 passes through the holes 24 in the plastic washer 17 but can reach the space above the piston assembly only by passing through the orifice 23 in the metal washer 20. This results in a dampening effect. When the rod 13 is moved in the opposite direction relative to the cylinder 11 as indicated by the arrow 26 in FIG. 2, such as when a deck lid is being closed, the O-ring 22 moves down relative to the rod. This opens the space $a$ between the metal washer 20 and the cylinder and, because the area of this space is approximately equal to the total area of the holes 24, oil and gas above the piston assembly flow comparatively freely around the metal washer and through the holes 24. Thus, there is virtually no dampening action as the spring is contracted. Although the pressures within the cylinder 11 vary according to application,typical pressures for use with a vehicle deck lid are approximately 1500 p.s.i. when the spring is contracted and 900 p.s.i. when the spring is expanded.

The present invention contemplates the provision of an improved closure for the upper or head end of the cylinder 11 so as to effect a good seal without welding any parts thereby simplifying the closure and reducing its cost. To this end, the closure comprises a plug 28 having a lower or inner cylindrical portion 28' which coacts with a seal portion 31 to seal the head end and an upper or outer integral cylindrical portion 29 which coacts with the wall of the cylinder 11 in a novel manner to hold the plug in place in the cylinder adjacent the head end thereof.

As shown most clearly in FIG. 2, the diameter of the inner portion 28' of the plug 28 is approximately equal to the internal diameter of the cylinder 11 so that this inner portion fits snugly in the cylinder. An annular groove 30 is formed in the periphery of the inner portion intermediate the ends thereof and extends completely around this portion of the plug to receive an O-ring which constitutes the seal member 31 and is made of a resilient material such as rubber or the like. The ring 31 bears against the inner wall of the cylinder and the groove 30 and thus forms a seal between the plug and the cylinder.

In order that the outer portion 29 holds the plug 28 in place in the cylinder 11, generally longitudinally or axially extending teeth 32 are formed around the periphery of this portion and are constructed so that, when the plug is inserted into the cylinder, the teeth are embedded in the cylinder wall. Thus, the teeth are comparatively sharp and the outer or tip diameter of the teeth is greater than the internal diameter of the cylinder but smaller than the external diameter of the cylinder so thatthe teeth project into the cylinder wall a distance substantially less than the full thickness of the wall. Preferably, the root diameter of the teeth 32 is smaller, or at least no greater, than the internal diameter of the cyliner. With is arrangement, the head end of the cylinder initially is straight and, with the O-ring 31 in place in the groove 30, the plug 28 is forced into the cylinder. The inner portion 28' slides into the cylinder but, as the outer portion 29 enters the cylinder, the teeth 32 bite into the cylinder wall and thereby form a relatively rigid connection between the plug and the cylinder.

Herein, a cylindrical boss 33 of reduced diameter and coaxial with the plug 28 is formed integrally on the outer end of the outer portion 29 of the plug. The plug is inserted beyond the end of the cylinder 11 and the end portion 34 of the cylinder is turned in over the portion 29 and around the boss 33. Coaxial with the plug and upstanding from the boss is a threaded pin 35 which, as shown in FIG. 1, receives the fitting 16, the latter in this instance being a socket.

The seal assembly 14 between the rod 13 and the cylinder 11 is constructed so that a body of oil is maintained between the sealing means or elements of the assembly 14 and the gas in the cylinder 11 regardless of the angular attitude of the spring 10. In general, this is achieved by providing a reservoir 36 for oil disposed interiorly of the sealing elements and communicating with a plurality of capillary passages, herein grooves 37, which also are interior of the sealing elements and which extend generally axially or longitudinally along the inner wall of the cylinder 11. The passages communicate with the reservoir and contain oil to insure that there is oil in the reservoir and thus that there is oil between the sealing elements and the gas. The invention further resides in the selection of the materials for the sealing assembly 14 so that, should the pressure within the cylinder 11 beome excessive such as by overheating, the sealing assembly safely releases the oil and gas in a controlled manner without the cylinder rupturing.

In the present instance, the sealing assembly 14 includes an annular wiper 38 supported in a circular metal retainer 39 which, as shown most clearly in FIG. 3, is seated on the inturned bottom end portion 40 of the cylinder 11. The wiper is made of a material such as polyurethane and includes a flexible flange 41 projecting downwardly and inwardly to encircle and bear against the rod 13 whereby the flange wipes the rod as the latter slides into and out of the cylinder. Resting on the retainer 39 in a metal cylinder 42 with a bore 43 enlarged at its upper end as indicated at 44 and a bearing sleeve 45 of a plastic material such as nylon is disposed within the bore 43 to encircle the rod 13 and is formed with a flange 46 received in the enalargement 44 of the bore 43. An O-ring 47 of rubber or the like is disposed in an annular groove 48 in the metal cylinder 42 and provides a seal between the latter and the main cylinder 11. Projecting upwardly from the cylinder 42 around the periphery thereof is a flange 49 which forms a cup to receive a circular sealing member or disk 50 made of an elastomer such as nitrile rubber, the retainer 39 and the cylinder 42 constituting a supporting means for the disk 50. A flange 51 upstanding from the periphery of the disk 50 bears against the flange 49 and a boss 52 on the center of the disk fits snugly around the rod 13 to form a seal between the rod and the metal cylinder 42. It will be observed, therefore, that the O-ring 47 and the disk 50 together with the cylinder 42 form the sealing means between the rod and the cylinder 11.

Figure 6:
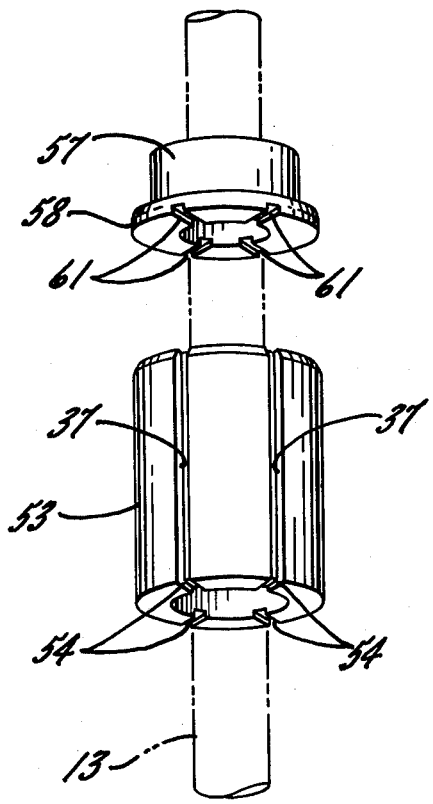
FIG. 6 is an exploded perspective view of the parts which form the reservoir and the capillary grooves.

To provide the reservoir 36 and the capillary grooves 37, a cylindrical member 53 made of a plastic such as nylon rests on the metal cylinder 42 and is sized to fit snugly within the cylinder 11. The interior of the member 53 is hollow to provide a downwardly opening cavity which constitutes the reservoir 36. As shown in FIG. 6, four capillary grooves are used and they are equally spaced around the member 53 and are parallel to the axis of the cylinder 11. At their lower ends, the grooves 37 intersect radial grooves 54 in the bottom of the member 53 so that the capillary grooves 37 communicate with the reservoir. An O-ring 55 of rubber or the like is seated in an upwardly opening circular groove 56 in the member 53 and encircles the rod 13 to provide a seal between the member and the rod and maintain the oil in the reservoir.

On top of the cylindrical member 53 is a retainer ring 57 which encircles the rod 13 and has a diameter smaller than the internal diameter of the cylinder 11. A radial flange 58 projects outwardly from the lower end of the ring 57 toward the inner wall of the cylinder and the latter is crimped as indicated at 59 so that the flange bears on the inner wall of the cylinder to hold the various parts of the seal assembly 14 in position. The bore 60 of the ring 57 is larger in diameter than the rod 11 thus leaving an annular space b between the two and four radial grooves 61 (see FIG. 6) are formed in the underside of the retainer 57 to connect the space b with the capillary grooves 37.

As stated above, the cylinder 11 is filled with a combination of oil and a gas under pressure. The oil is inserted in the cylinder first with the interior of the cylinder being at atmospheric pressure. The oil flows into the various spaces within the sealing assembly 14 including the reservoir 36 and the capillary grooves 37 and also generally covers the sealing assembly. The gas in the cylinder then is pressurized but there is virtually no gas in the sealing assembly. Accordingly, the capillary attraction of the oil in the grooves 37 maintains a supply of oil to replenish oil lost from the reservoir not only when the gas spring is being expanded or contracted but also when the spring is in a static or inoperative condition and, further, this body of oil is maintained irrespective of the angular attitude of the spring 10. Moreover, by using plastic or plastic-like materials for parts of the sealing assembly 14 and particularly for the cylindrical member 53, the seal disk 50 and the bearing sleeve 45, these parts have a proportionally greater loss in tensile strength as compared to the cylinder as the temperature increases. Accordingly, should the pressure within the cylinder become excessive as by overheating, the excess pressure is safely released around the rod 11 and out through the lower end of the cylinder without the cylinder rupturing and the pressure is released at a predictable level and in a controlled manner. Also, the inner seal or disk 50 is located roughly midway between the ends of the sealing assembly. As result, the rod 13 is supported for virtually true axial movement particularly relative to the cylinder 42 and the member 53 and this maximizes the ability of the seal to remain in contact with the rod when the rod is subjected to opposing eccentric displacement forces on the rod as would be caused by side loading.

I claim:

1. In a piston and cylinder assembly having an elongated cylinder with a head end and a rod end, a piston slidable in said cylinder and a rod connected to said piston and projecting out of said cylinder through said rod end, said cylinder being formed by a wall of preselected thickness and having predetermined internal and external diameters, a closure for said head end, said closure comprising a plug disposed within said cylinder adjacent the head end thereof and having integrally formed inner and outer cylindrical portions, the diameter of said inner portion being substantially the same as said internal diameter of the cylinder to fit snugly within the cylinder, said inner portion having an annular groove formed in the periphery thereof, a ring of resilient material seated in said groove and bearing against the inside of said wall to form a seal between said plug and said cylinder, and a plurality of sharp elongated teeth formed around the periphery of said outer portion of said plug and extending generally longitudinally thereof, the outer diameter of said teeth being greater than said internal diameter of said cylinder and smaller than said external diameter thereof whereby said teeth bite into the wall of the cylinder and hold said plug in a fixed position relative to the cylinder.

2. A construction as defined by claim 1 in which the root diameter of said teeth is no greater than said internal diameter of the cylinder.

* * * * *